United States Patent

Shannon

[15] 3,695,336
[45] Oct. 3, 1972

[54] METHOD OF MAKING BATTERY POST TERMINAL CLAMP
[72] Inventor: John K. Shannon, Kenosha, Wis.
[73] Assignee: Quick Cable Corporation, Kenosha, Wis.
[22] Filed: July 31, 1970
[21] Appl. No.: 67,669

Related U.S. Application Data

[62] Division of Ser. No. 796,458, Feb. 4, 1969, Pat. No. 3,588,790.

[52] U.S. Cl. .................................................. 164/98
[51] Int. Cl. ............................................. B22d 19/00
[58] Field of Search.......... 164/98, 9, 30, 31, 32, 111, 164/112, 332

[56] References Cited

UNITED STATES PATENTS

| | | | |
|---|---|---|---|
| 1,477,640 | 12/1923 | Fisher | 164/112 X |
| 3,098,270 | 7/1963 | Bauer | 164/112 X |
| 2,066,658 | 1/1937 | Street | 164/9 |
| 1,535,350 | 4/1925 | Stacy | 164/112 X |
| 1,732,515 | 10/1929 | Hunter | 164/112 |
| 2,057,103 | 10/1936 | Lolley | 164/31 |
| 2,480,966 | 9/1949 | Richardson | 164/111 X |
| 2,999,800 | 9/1961 | Reeside | 164/111 X |

Primary Examiner—J. Spencer Overholser
Assistant Examiner—John S. Brown
Attorney—Dominik, Knechtel & Godula

[57] ABSTRACT

The disclosure is of a battery terminal post clamp having a pair of opposed clamping jaws with stud means at the end for securing the terminal to the battery post. The shank portion which receives the cable has a tie bolt, threaded at one end, with a cable receiving hole in the central portion aligned with a hole in the shank to receive the cable. The bottom portion of the tie bolt is threaded for engagement with a nut which, when the end of the cable is inserted in the tie bolt hole, can be turned to thereby jammingly engage the cable end forming a physical and electrical bond with the battery terminal. The method of manufacture contemplates a die casting in which the tie bolt itself serves as a core member, and an additional core is inserted through the hole in the tie bolt to the end that the tie bolt is perfectly aligned in the precast battery terminal, and in a sense is press-fittingly engaged therein, subject to dislodgment only by turning the fastening nut to engage the cable end.

1 Claim, 12 Drawing Figures

PATENTED OCT 3 1972 3,695,336
SHEET 1 OF 2
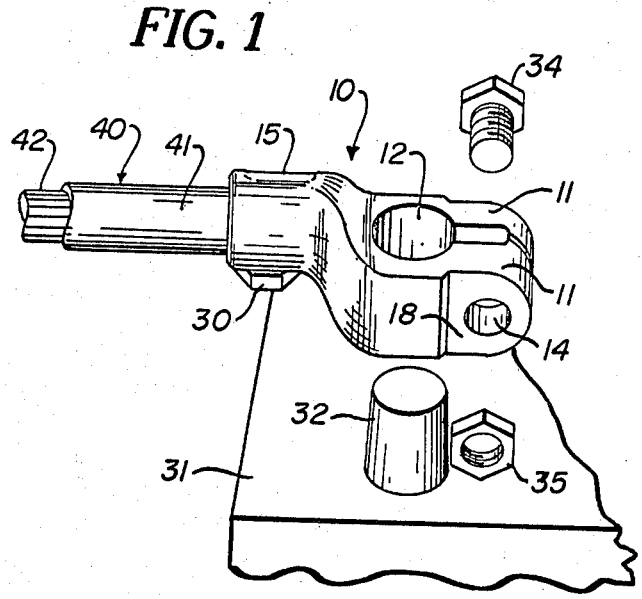
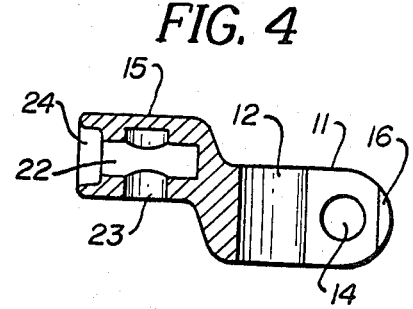
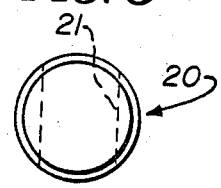
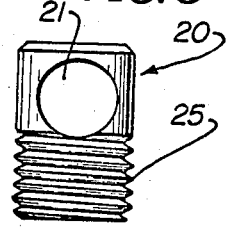
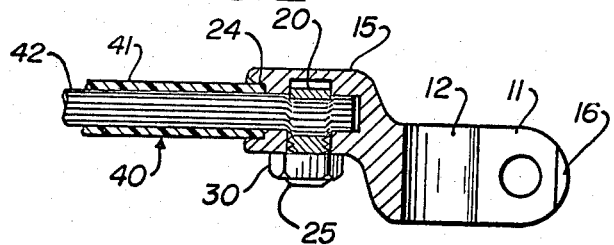
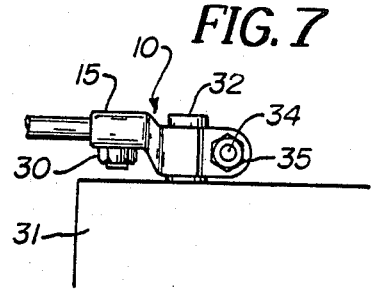
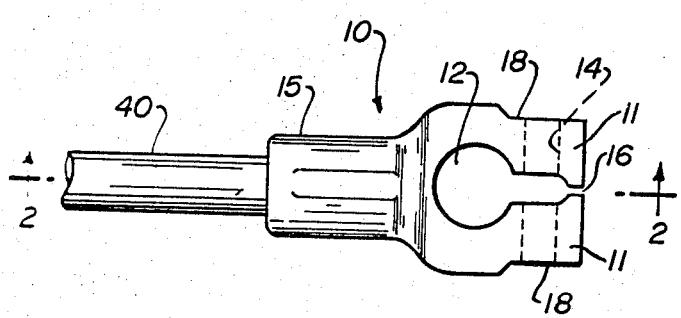
INVENTOR
John K. Shannon
BY
Dominik, Knechtel & Godula
ATTYS.

INVENTOR
John K. Shannon
BY
Dominik, Knechtel & Godula
ATTYS

METHOD OF MAKING BATTERY POST TERMINAL CLAMP This application is a division of Ser. No. 796,458, now U.S. Pat. No. 3,588,790.

The present invention relates to a battery terminal post clamp and method of making the same. More particularly it relates to a battery terminal post connector which is especially adapted for rewiring a battery, or special installations, in which the cable must be secured to the terminal by an adjustment in a repair station, or in the field. It is additionally useful for original equipment manufacturers where varying lengths of cable will be required, and a secure attachment is desirable.

The art of manufacturing battery terminal post clamps is replete with examples of terminal connectors for securing the same to a battery post. Several approaches have been taken to securing the cable to the terminal, such as disclosed in U.S. Pat. Nos. 3,377,609, 3,409,865, 3,396,362, and 3,397,382.

The above products relate primarily to battery terminal post clamps which are not die cast, or if die cast, employ a cable which has a lead already secured to its end. In those instances where the cable is sold in varying lengths, and will be cut to fit the particular installation, it is highly desirable to provide a positive means for attaching a stripped end of a cable to the battery terminal, and more particularly in which the connection is insulated at its entrance to the battery terminal, and yet sturdy in providing strong electrical contact in the interior.

In view of the foregoing, it is a primary object of the present invention to provide a means for physically and electrically coupling a stripped cable end to a battery terminal which requires only the turning of one nut after the cable has been inserted in the terminal post clamp.

A further object of the present invention looks to the provision of a battery terminal post clamp with a tie bolt and nut which are inexpensive to mold, and yet insure a high degree of flexibility in the wiring of a vehicle or other battery installation in the field.

Still another object of the present invention is to provide a construction for a battery terminal post clamp with a single nut for securing the cable therein in which the nut is positioned in an offset relationship to the shank which receives the cable, and thereby avoids an irregular exposed surface which could become contaminated, or otherwise require additional clearance. A related advantage to placing the nut in a horizontal silhouette relating to the battery terminal post clamp stems from the problem of positioning a cap or cover over the same, which is not interfered with by positioning the nut in accordance with the construction exemplary of the present invention.

In die casting a battery terminal post clamp, there is always a problem, particularly with a tie bolt which is at a transverse axis of the receiving bore for the cable, to provide for perfect alignment. One aspect of the present invention is to provide a method for die casting the tie bolt, which is conventionally formed as a screw machine product, directly into the battery terminal post clamp using the same as a core for the tie bolt hole, and simultaneously receiving the core for the cable holder shaft to the end that perfect alignment is insured for the cable. A related object of the method of forming the battery terminal post clamp results from the secured relationship for shipping and use by the customer of the tie bolt within the battery terminal post clamp, the only loose part being a conventional nut which, if lost, can be replaced by other nuts available at the repair station or point of use.

Further objects of the present invention will become apparent as the following description of an illustrative embodiment proceeds, in conjunction with the accompanying drawings, in which:

FIG. 1 is a perspective partially exploded view of the illustrative battery post terminal clamp showing the relationship between the jaw bolt and jaw nut with the tie bolt nut and tie bolt in place secured to the cable.

FIG. 2 is a longitudinal sectional view of the battery post terminal clamp shown in FIG. 1 taken along section line 2—2 of FIG. 3, showing the jamming engagement of the cable by the tie bolt.

FIG. 3 is a bottom view of the battery post terminal clamp.

FIG. 4 is a view of the terminal post casting taken from the same position as FIG. 2.

FIG. 5 is a top view of the tie bolt.

FIG. 6 is a front elevation of the tie bolt.

FIG. 7 is a front elevation in reduced scale illustrating the assembled relationship between the battery post terminal clamp and a battery.

Figure 8:
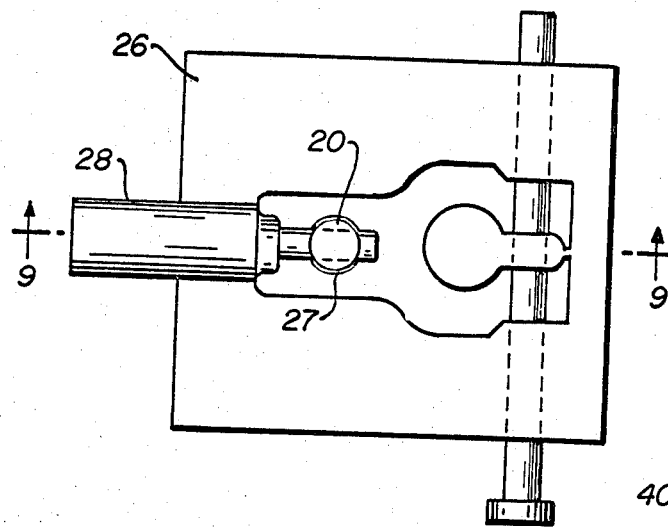
FIG. 8 is a top view of the lower half of the battery post terminal clamp mold.

As illustrated in FIG. 1, the battery post terminal clamp 10 terminates at one end in a pair of opposed jaws 11, having a conventional battery post bore 12. It is contemplated that in assembled relationship, as shown in FIG. 7, the terminal post clamp 10 is secured to the battery terminal post 32 which is positioned atop the battery 31 by means of a jaw bolt 34 and a jaw nut 35 which is tightened thereagainst to bring the two jaws 11 in clamping engagement with the battery terminal post 32. The opposed crescent-shaped teeth 16 permits sufficient deflection of the jaws 11 when secured by means of the jaw bolt 34 and jaw nut 35 to physically and electrically securely engage the battery post terminals 32 to be abuttingly engaged by the interior portions of the jaw bolt 34 and jaw nut 35. Opposed jaw bores 14 are provided to receive the jaw bolt 34 and jaw nut 35 and complete the engagement.

The invention concerns itself more particularly with the offset tie bolt shank 15 which extends oppositely from the battery post clamping jaws 11. It is offset upwardly to provide relief for the tie bolt nut 30 which, when secured to the tie bolt 20 as illustrated in FIG. 2, jammingly engages the cable core 42. The specific configuration of an illustrative tie bolt 20 is shown in FIGS. 5 and 6 where it will be seen that the tie bolt may be formed by conventional screws machine techniques from a rod, one commercial embodiment contemplating a 13/16 inch diameter rod, ⅝ inch long with a ¼ inch cable hole 21 provided therein. Tie bolt threads 25 are provided at the lower portion of the tie bolt 20 to receive the threaded interior bore of the tie bolt nut 30.

Figure 11:
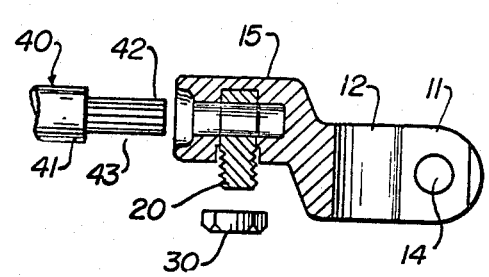
FIG. 11 is a section of the cast battery terminal clamp taken along section 9—9 of FIG. 10 diagrammatically showing the relationship with the cable.
Figure 12:
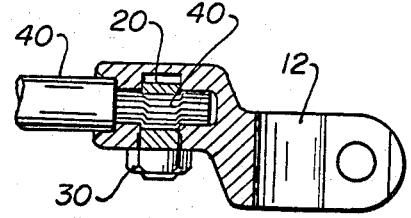
FIG. 12 is a subsequent showing of the structure of FIG. 11 after the cable is secured.

In positioning the cable 40 within the terminal post clamp 10, the steps are best illustrated in FIGS. 11 and 12. There it will be seen that the cable 40 has an insulating portion 41 which is stripped away from the cable core 42 to provide a stripped end portion 43. The stripped end portion 43 is of sufficient length to fit almost to the dead end of the shank cable bore 22 in the offset shank 15 of the terminal post clamp 10. After the end of the cable 40 has been prepared in accordance with the configuration shown in FIG. 11, the stripped end 43 is inserted into the shank cable bore 22, the tie bolt nut then engaged with the tie bolt threads 25 and tightened until a deformed section 44 appears in the stripped end 43, leaving a locking end 45 at the far end of the stripped end 43. It will be further observed that an insulating ring or shoulder 24 has been provided at the far end of the offset shank 15 to receive the end of the insulation 41, thereby providing an insulated connection between the cable 40 and the terminal post clamp 10. As will be observed in FIG. 7, there is sufficient clearance provided between the offset shank 15 and the battery 31 so that a conventional end wrench may readily engage the tie bolt nut 30 and secure the same to the battery post 32. After the cable has been secured to the terminal post clamp 10, the terminal post clamp 10 is then secured to the battery terminal post 32 by the threaded clamping engagement of the jaws 11 by the jaw bolt 34 and jaw nut 35. The connection is physically secured, electrically intimate, and resists dislodgement. It will be readily appreciated that varying lengths of cable 40 may be easily stripped and secured to the terminal post clamp 10 as hereinabove described.

Figure 9:
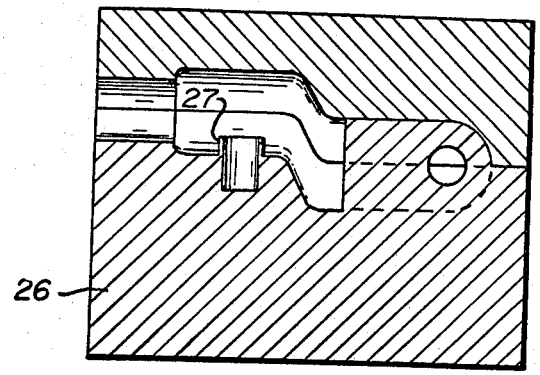
FIG. 9 is a transverse sectional view of the mold taken along section 9—9 of FIG. 8.
Figure 10:
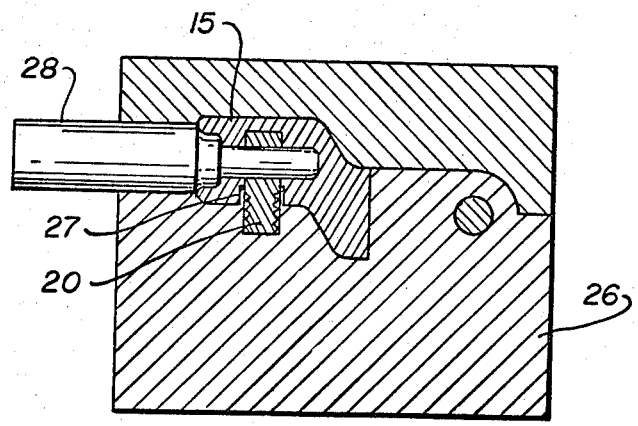
FIG. 10 is a taken from the same section as FIG. 9 showing the mold after the metal has been injected into the mold.

Another aspect of the invention relates to the method of forming the battery post terminal clamp 10 with the tie bolt 20 serving as a portion of the mold, to the end that the tie bolt 20 has a metallic cast interface between its peripheral cylindrical surface and the tie bolt bore 23, in the offset shank 15. As shown diagrammatically in Fig. 8–10, a mold 26 is provided for die casting the battery terminal post clamp 10 in which the tie bolt 20 is secured within the mold and actually forms the core for providing the configuration of the tie bolt bore 23. A side core 28 is provided to nestingly engage the cable hole 21 of the tie bolt 20, and extends therethrough to complete the coring to provide for the shape of the shank cable bore 22 and the insulation ring 24. A thread shield 27 in the form of a collar in the mold prevents molten metal from fouling the tie bolt threads 25 during casting.

The mold is filled in the conventional manner, and thereafter the cores for the post bore 12, jaw bore 14, and the core 28 which forms the shank cable bore 22 are removed. Thereafter the configuration, in cross-section, is exactly as shown in FIG. 11 with the tie bolt 20 case in place in the shank 15 of the battery post clamp 10. The distinct advantage of this method of formation is that the casting of the tie bolt 20 in place within the shank 15 prevents its accidental dislodgement, and in shipping a kit, only the tie bolt nut 30 need be a loose part.

In positioning the terminal post clamp 10 for securement to the cable 40 as illustrated in FIGS. 11–12, the alignment between the cable hole 21 of the tie bolt 20 and the stripped end 43 of the cable 40 is insured to be accurate since it is cast in place. Thus an elimination of a further possible problem when jammingly engaging the stripped end 43 of the cable 40 is eliminated. After the cable 40 is secured within the tie bolt 20 and offset shank 15 when the battery terminal post clamp 10 has the tie bolt cast in place, the same is secured to the battery terminal post 32 in the manner described relating to FIG. 7.

In review it will be seen that a terminal post clamp 10 and tie bolt 20 have been described which clampingly engage the cable 40 with a neat, clean silhouette in good insulating engagement, sound physical engagement which prevents dislodgement, and with an intimate electrical contact between the elements of the cable 40 and the battery terminal post 32.

Additionally, a method has been disclosed of fabricating the terminal post clamp 10 with a tie bolt 20 in place, the tie bolt itself serving as a portion of the mold and thereafter remaining in intimate precast contact with the shank 15 until such time as the same is dislodged by use, or the user otherwise wishes to remove the tie bolt 20 with the tie bolt nut 30.

While the invention has been described in connection with specific embodiments and applications, no intention to restrict the invention to the examples shown is contemplated, but rather to include within the invention all of the subject matter defined by the spirit as well as the letter of the annexed claims.

I claim:

1. The method of forming a battery post terminal clamp having a tie bolt with a stripped cable portion receiving hole therein comprising the steps of:

preparing a die casting mold for a battery post terminal clamp having a battery post receiving cylindrical portion, jaws for clamping the same, and a shank extending oppositely from the jaws, providing a core for the shank portion, said core snug-fittingly engaging the cable receiving hole of the tie bolt and thereby supporting the tie bolt within the mold and centrally positioned within the shank, positioning a thread shield in the form of a collar about the thread of said tie bolt, positioning said core and tie bolt with said thread shield thereon within the mold, molding the same and thereafter withdrawing said core, then removing said battery post terminal clamp from the mold with the tie bolt precast in place aligned for receiving the cable and secured at the interfacial casting portion of the shank and tie bolt against rotation or dislodgement from alignment for receiving the cable.

* * * * *